(12) United States Patent
Dimou et al.

(10) Patent No.: US 11,711,172 B1
(45) Date of Patent: Jul. 25, 2023

(54) HYBRID AUTOMATIC REPEAT REQUEST FEEDBACK RETRANSMISSION

(71) Applicant: QUALCOMM Incorporated, San Diego, CA (US)

(72) Inventors: Konstantinos Dimou, New York City, NY (US); Mostafa Khoshnevisan, San Diego, CA (US); Yan Zhou, San Diego, CA (US); Yi Huang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/823,859

(22) Filed: Aug. 31, 2022

Related U.S. Application Data

(60) Provisional application No. 63/267,984, filed on Feb. 14, 2022.

(51) Int. Cl.
| | |
|---|---|
| *H04L 5/00* | (2006.01) |
| *H04L 1/00* | (2006.01) |
| *H04W 28/04* | (2009.01) |
| *H04W 72/04* | (2023.01) |
| *H04W 88/08* | (2009.01) |
| *H04L 1/1829* | (2023.01) |
| *H04L 1/1812* | (2023.01) |

(52) U.S. Cl.
CPC .......... *H04L 1/1854* (2013.01); *H04L 1/0061* (2013.01); *H04L 1/1812* (2013.01)

(58) Field of Classification Search
CPC ... H04W 28/04; H04W 72/04; H04W 72/042; H04W 88/08; H04L 5/0007; H04L 1/1854; H04L 1/0061; H04L 1/1812
USPC ......................................................... 370/329
See application file for complete search history.

(56) References Cited

U.S. PATENT DOCUMENTS

| | | | |
|---|---|---|---|
| 2013/0028213 A1* | 1/2013 | Ko ........................ | H04B 7/0413 370/329 |
| 2015/0180617 A1* | 6/2015 | Sun ........................ | H04L 1/1861 370/329 |
| 2015/0282125 A1* | 10/2015 | Lee ....................... | H04L 1/1851 370/329 |

(Continued)

FOREIGN PATENT DOCUMENTS

| | | | | |
|---|---|---|---|---|
| CN | WO 2021/213384 A1 * | 10/2021 | ............... | H04L 1/18 |
| SE | WO 2018/171927 A1 * | 9/2018 | ............ | H04W 72/04 |

OTHER PUBLICATIONS

International Search Report and Written Opinion—PCT/US2023/060483—ISA/EPO—dated Mar. 20, 2023.

(Continued)

*Primary Examiner* — Peter G Solinsky
*Assistant Examiner* — Sanjay K Dewan
(74) *Attorney, Agent, or Firm* — Patterson + Sheridan, L.L.P.

(57) ABSTRACT

Certain aspects of the present disclosure provide techniques and apparatus for hybrid automatic repeat request (HARQ) feedback retransmission. An example method of wireless communication by a user equipment generally includes receiving signaling indicating to reschedule HARQ feedback for transmission; determining the HARQ feedback based at least in part on one or more fields of the signaling; and transmitting the HARQ feedback based on the determination.

28 Claims, 10 Drawing Sheets

(56) References Cited

U.S. PATENT DOCUMENTS

2019/0313386 A1* 10/2019 Hwang ................ H04W 72/12
2020/0220693 A1*  7/2020 Babaei ................ H04W 28/04

OTHER PUBLICATIONS

Nokia, et al., "HARQ-ACK Feedback Enhancements for URLLC/IIoT", 3GPP TSG RAN WG1 #106-bis-e, R1-2109159, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, 27 Pages, XP052058119, Figure 5.1, Section 5.

Spreadtrum Communications: "Discussion on HARQ-ACK Feedback Enhancements for Rel-17 URLLC", 3GPP TSG RAN WG1 #107bis-e, R1-2200274, 3rd Generation Partnership Project, Mobile Competence Centre, 650, Route Des Lucioles, F-06921 Sophia-Antipolis Cedex, France, vol. RAN WG1, No. e-Meeting, Jan. 17, 2022- Jan. 25, 2022, Jan. 11, 2022, 6 Pages, XP052093090, Figure 1 Section 3.

* cited by examiner

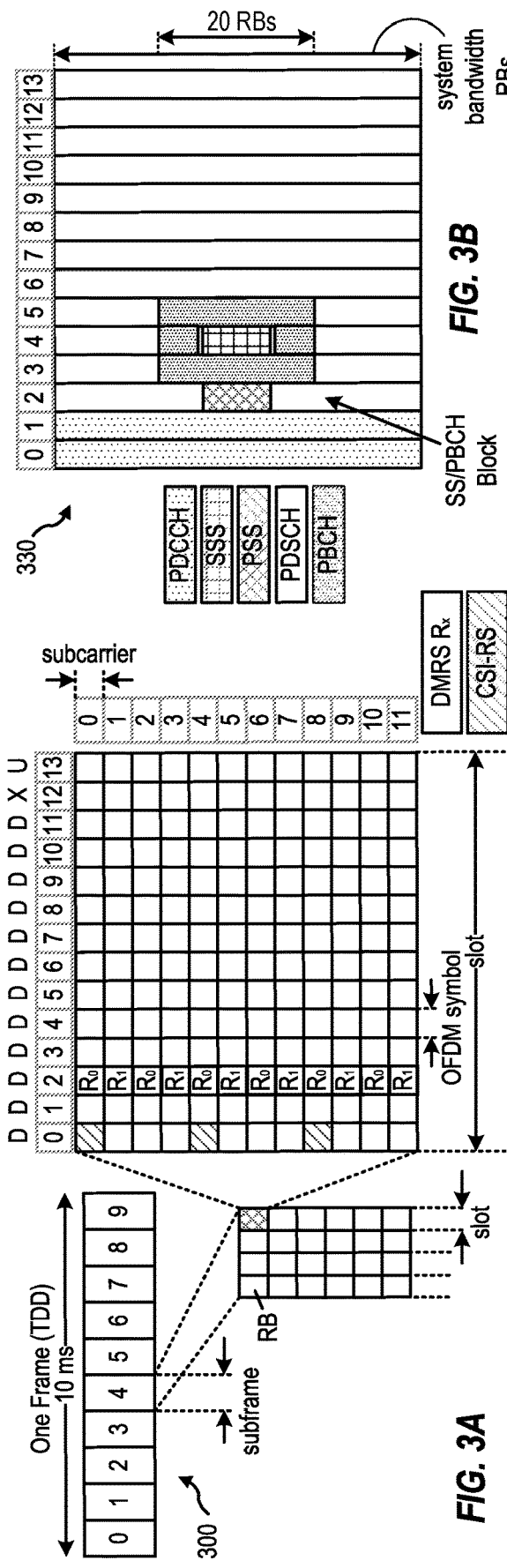
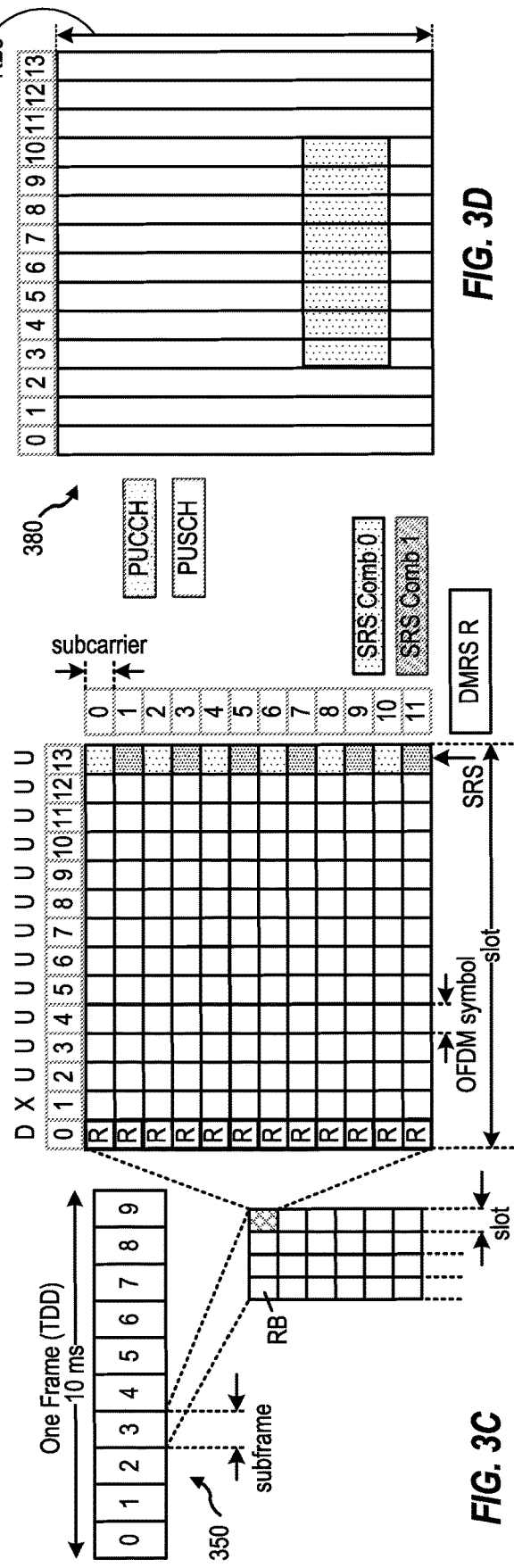
FIG. 3A
FIG. 3B
FIG. 3C
FIG. 3D

HYBRID AUTOMATIC REPEAT REQUEST FEEDBACK RETRANSMISSION

CROSS-REFERENCE TO RELATED APPLICATION

The present Application for Patent claims benefit of U.S. Provisional Application No. 63/267,984, filed Feb. 14, 2022, which is hereby expressly incorporated by reference herein in its entirety.

INTRODUCTION

Aspects of the present disclosure relate to wireless communications, and more particularly, to techniques for communicating hybrid automatic repeat request (HARQ) feedback.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides an example method of wireless communication by a user equipment (UE). The method generally includes receiving signaling indicating to reschedule hybrid automatic repeat request (HARQ) feedback for transmission; determining the HARQ feedback based at least in part on one or more fields of the signaling; and transmitting the HARQ feedback based on the determination.

One aspect provides an example method of wireless communication by a network entity. The method generally includes sending, to a user equipment (UE), signaling indicating to reschedule hybrid automatic repeat request (HARQ) feedback for transmission, wherein the signaling identifies the HARQ feedback based at least in part on one or more fields of the signaling; and obtaining the HARQ feedback in response to the signaling.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

DETAILED DESCRIPTION

Figure 1:
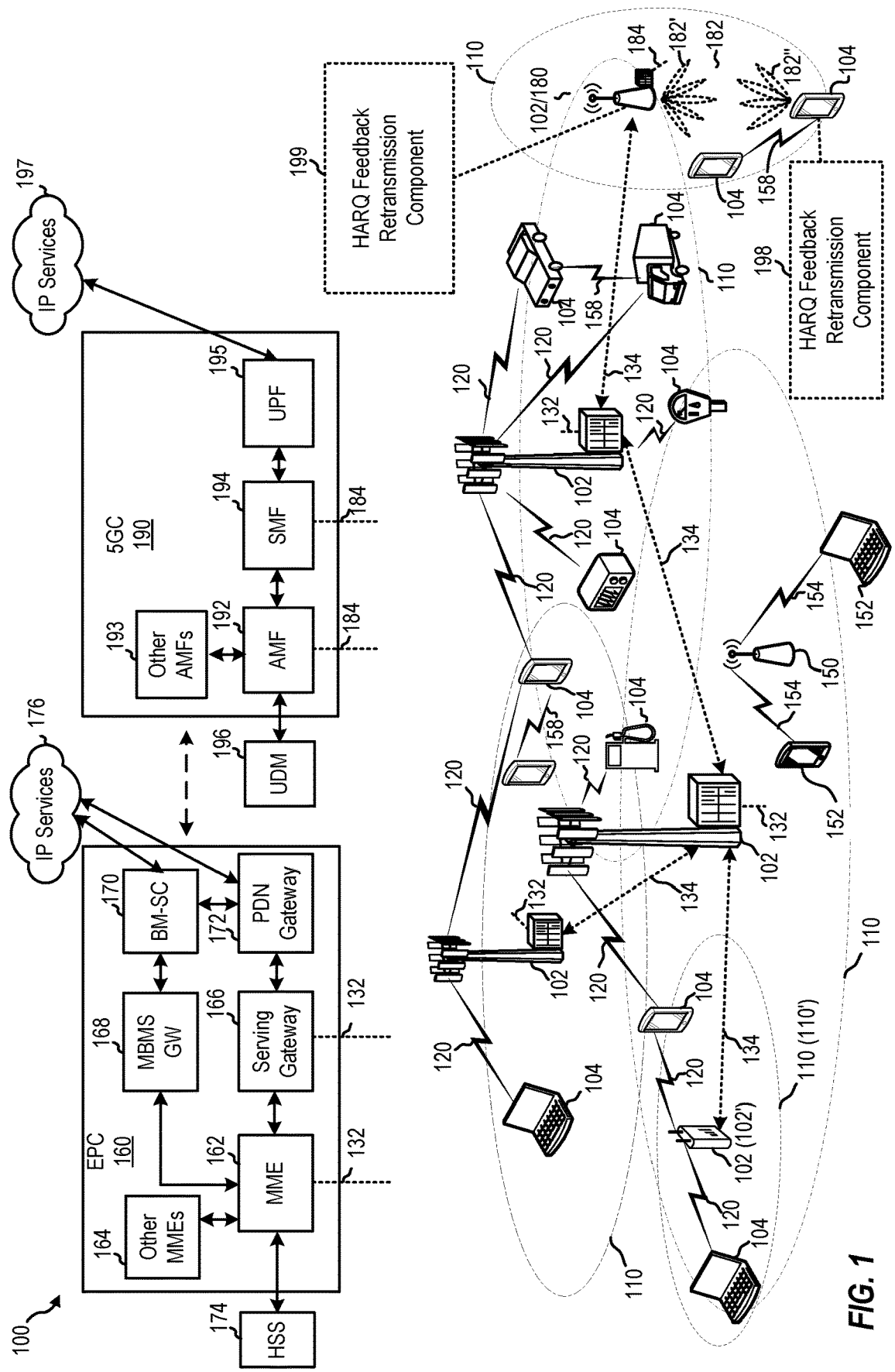
FIG. 1 is a block diagram conceptually illustrating an example wireless communication network.

Aspects of the present disclosure provide apparatuses, methods, processing systems, and computer-readable mediums for a hybrid automatic repeat request (HARQ) feedback retransmission.

Certain wireless communication networks (e.g., 5G New Radio (NR) systems) may use radio network temporary identifiers (RNTIs) to scramble certain control signaling for a specific user equipment (UE) or a group of UEs. RNTIs may be used for scrambling control signaling for specific types of information, such as system information, transmit power controls, and/or configured scheduling, such as semi-persistent scheduling. Certain wireless communication networks (e.g., 5G NR systems) may support transmission of data with HARQ to enable forward error correction at the receiver in addition to automatic re-transmission of corrupted data at a receiver. A transmitter (e.g., a base station) may send an initial transmission of data to a receiver (e.g., a UE), and if the data is corrupted at the receiver, the transmitter may send one or more retransmissions of the data. The receiver may send, to the transmitter, HARQ feedback to indicate whether a transmission was successfully decoded.

In certain cases, control signaling (e.g., downlink control information (DCI)) may have a cyclic redundancy check (CRC) scrambled with a specific RNTI, such as a cell random network identifier (C-RNTI) or a configured scheduling RNTI (CS-RNTI). If the CRC is scrambled with a certain RNTI, a particular field in the control signaling may be designated for indicating certain information, such as a modulation and coding scheme, an indication of the HARQ feedback to retransmit, or an indication of secondary cell dormancy. In some cases, there may be ambiguity as to the meaning of the field when the control signaling triggers a retransmission of HARQ feedback with certain RNTIs.

Aspects of the present disclosure provide methods and apparatus for indicating a HARQ feedback retransmission. For example, the DCI triggering the HARQ feedback retransmission may have a CRC scrambled with a C-RNTI. In such cases, a specific field (e.g., a modulation and coding scheme field associated with transport block 1) in the triggering DCI may be interpreted as a HARQ feedback retransmission offset (as further described herein with respect to FIG. 4), if the DCI indicates to transmit a HARQ feedback retransmission. In some cases, the DCI triggering the HARQ feedback retransmission may have a CRC scrambled with a CS-RNTI. In such cases, the triggering DCI may be allowed or not allowed to indicate release of semi-persistent scheduling for downlink transmission(s) or configured grant for uplink transmission.

The HARQ feedback retransmission described herein may enable improved wireless communication performance, for example, lower latencies and/or higher throughput. For example, a HARQ feedback retransmission may enable a network to prioritize other communications (e.g., URLLC) over receiving certain HARQ feedback and dynamically request the HARQ feedback retransmission.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes a HARQ feedback retransmission component 199, which may be configured to signal an indication to reschedule HARQ feedback for retransmission and receive the HARQ feedback in response to the signaling. Wireless communication network 100 further includes a HARQ feedback retransmission component 198, which may be configured to receive signaling indicating to reschedule HARQ feedback for retransmission and transmit the HARQ feedback.

Figure 2:
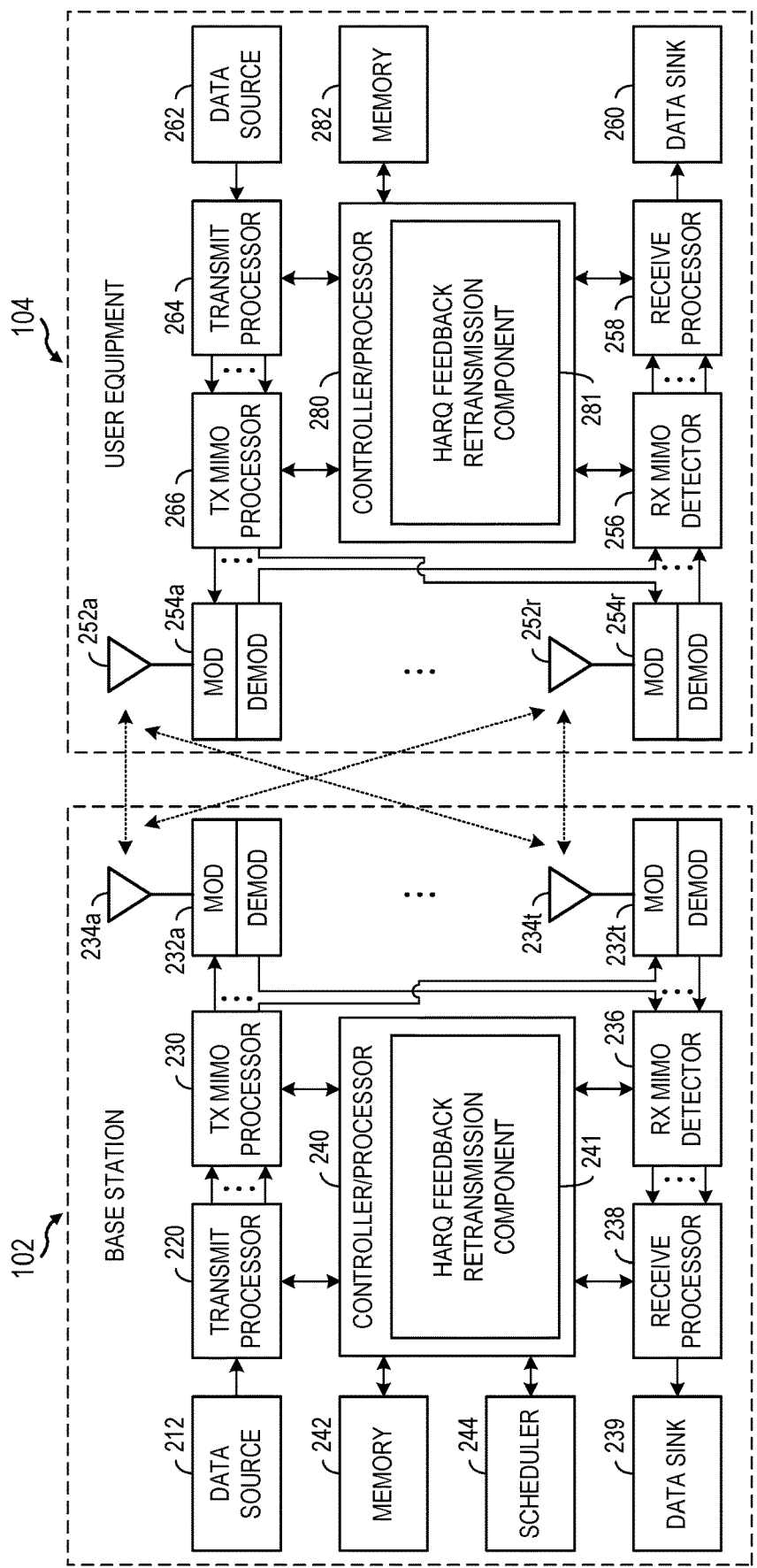
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes a HARQ feedback retransmission component 241, which may be representative of the HARQ feedback retransmission component 199 of FIG. 1. Notably, while depicted as an aspect of controller/processor 240, the HARQ feedback retransmission component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes a HARQ feedback retransmission component 281, which may be representative of the HARQ feedback retransmission component 198 of FIG. 1. Notably, while depicted as an aspect of controller/processor 280, the HARQ feedback retransmission component 281 may be implemented additionally or alternatively in various other aspects of UE 104 in other implementations.

While the user equipment 104 is described with respect to FIGS. 1 and 2 as communicating with a base station and/or within a network, the user equipment 104 may be configured to communicate directly with/transmit directly to another user equipment 104, or with/to another wireless device without relaying communications through a network. In some aspects, the base station 102 illustrated in FIG. 2 and described above is an example of another user equipment 104, or vice versa.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, HARQ feedback may be communicated in mmWave frequency bands and/or other frequency bands.

Example HARQ Communications

Certain wireless communication networks (e.g., 5G NR systems) may support transmission of data with hybrid automatic repeat request (HARQ) to provide forward error correction at a receiver in addition to automatic re-transmission of corrupted data to the receiver. For example, a transmitter (e.g., the BS 102) may send an initial transmission of data to a receiver (e.g., the UE 104), and if the data is corrupted at the receiver, the transmitter may send one or more retransmissions of the data (such as a transport block (TB), codeblock group (CBG), or one or more codeblocks) until the data is successfully decoded at the receiver, or the maximum number of retransmissions of the data has occurred, or some other termination condition is encountered.

As re-transmissions are received, the receiver may combine the received transmissions (including the initial transmission and re-transmissions) to attempt to decode the data. In certain cases, the receiver may send, to the transmitter, HARQ feedback to indicate whether a transmission was successfully decoded. The HARQ feedback may include an acknowledgment (ACK) to indicate the data is decoded successfully at the receiver or a negative-ACK (NACK) to indicate the data is decoded in error or unsuccessfully at the receiver. In certain cases, HARQ feedback may also be referred to as HARQ-ACK feedback or a HARQ-ACK codebook. The transmitter may send a re-transmission of the data if a NACK is received and may terminate transmission of the data if an ACK is received. In certain cases, the transmitter may send a re-transmission if the transmitter fails to receive an ACK within a certain period of time. The transmitter may process (e.g., encode and modulate) the data with forward error correction and/or redundancy information, which may be selected such that the data can be decoded successfully with a high probability. The data may also be referred to as a TB, a codeword, a data block, etc. In certain cases, a data transmission (e.g., a transport block) may be segmented into codeblocks (CBs), and re-transmissions may be triggered on a CBG basis (e.g., a group of codeblocks). In other words, a re-transmission may include a portion of the initial transmission, such as a codeblock group of a transport block.

In aspects, HARQ feedback (e.g., an ACK or a NACK) reported by a UE may be formatted according to a codebook. For example, a codebook with respect to HARQ may define the number of HARQ bits to be reported and the order in which certain HARQ information is arranged in the bits. The codebook may define what each HARQ bit represents based on the location of the HARQ bit in the HARQ feedback. For example, a given HARQ bit may correspond to a specific CBG, a specific TB, a specific HARQ process (e.g., HARQ process identifier), a specific carrier, and a specific serving cell. The codebook provides a mapping of the HARQ bit locations in the HARQ feedback to specific HARQ transmissions based on the respective CBG, TB, HARQ process, carrier, and/or serving cell. As used herein, a carrier may refer to a component carrier.

Certain wireless communication systems (e.g., 5G NR systems) may support various HARQ codebooks, such as a Type 1 codebook, a Type 2 codebook, or a Type 3 codebook. In general, the Type 1 codebook may have a fixed size for HARQ feedback associated with a specific time window. The Type 2 codebook may have a dynamic size for HARQ feedback. The Type 3 codebook may be associated with one-shot HARQ-ACK feedback. In certain cases (Release 17 of 3GPP), the Type 3 codebook may provide an enhanced codebook with a smaller size compared to certain releases in 3GPP (e.g., Release 16). The codebook size of a single triggered enhanced Type 3 HARQ-ACK codebook may be at least determined by a radio resource control (RRC) configuration. The enhanced Type 3 HARQ-ACK codebook construction may HARQ processes as a basis (e.g., ordered according to HARQ process IDs and/or serving cells)

In certain cases, a one-shot HARQ-ACK feedback scheme may be employed for the transmitter to request HARQ-ACK feedback on a dynamic basis. For example, a receiver may be configured to refrain from reporting HARQ-ACK feedback, until the transmitter sends a request for HARQ feedback to the receiver. For example, the one-shot HARQ-ACK feedback scheme may be employed when the network is transmitting certain packets without re-transmissions (e.g., in ultra-reliable, low-latency communications (URLLC) applications), and the network may decide when to request HARQ feedback from a UE, for example, when certain network service demands and/or loads (e.g., data rates, latencies, reliability) have lessened. In response to the one-shot HARQ-ACK feedback request, the receiver may send, to the transmitter, the latest status of all of the HARQ processes configured for one or more carriers and/or serving cells. The receiver may send a snapshot of the ACK-NACK information related to the transmission(s) received at the receiver.

Certain wireless communication systems (e.g., 5G NR systems) may support a HARQ feedback retransmission, for example, due to a cancelled HARQ feedback. The network and/or UE may decide to cancel HARQ feedback, for example, in response to higher priority transmissions. In certain cases, the network may decide to cancel HARQ feedback by receiving HARQ feedback from a UE and/or by scheduling other communications in the transmission occasion of the HARQ feedback. The UE may decide to cancel HARQ feedback by performing other communications, for example, transmitting and/or receiving other signals in the transmission the HARQ feedback.

The wireless communication system may support one-shot (e.g., dynamic) triggering (e.g., via downlink control information (DCI) associated with a downlink assignment) of HARQ feedback retransmission on an uplink channel resource (e.g., physical uplink control channel (PUCCH) resource). The HARQ feedback retransmission may be associated with a Type 1 codebook, Type 2 codebook, Type 3 codebook, or an enhancement thereof. The DCI triggering (e.g., via a downlink assignment) the one-shot HARQ-ACK retransmission on a PUCCH resource may dynamically indicate the HARQ-ACK codebook(s) and/or corresponding PUCCH occasions to be re-transmitted.

Figure 4:
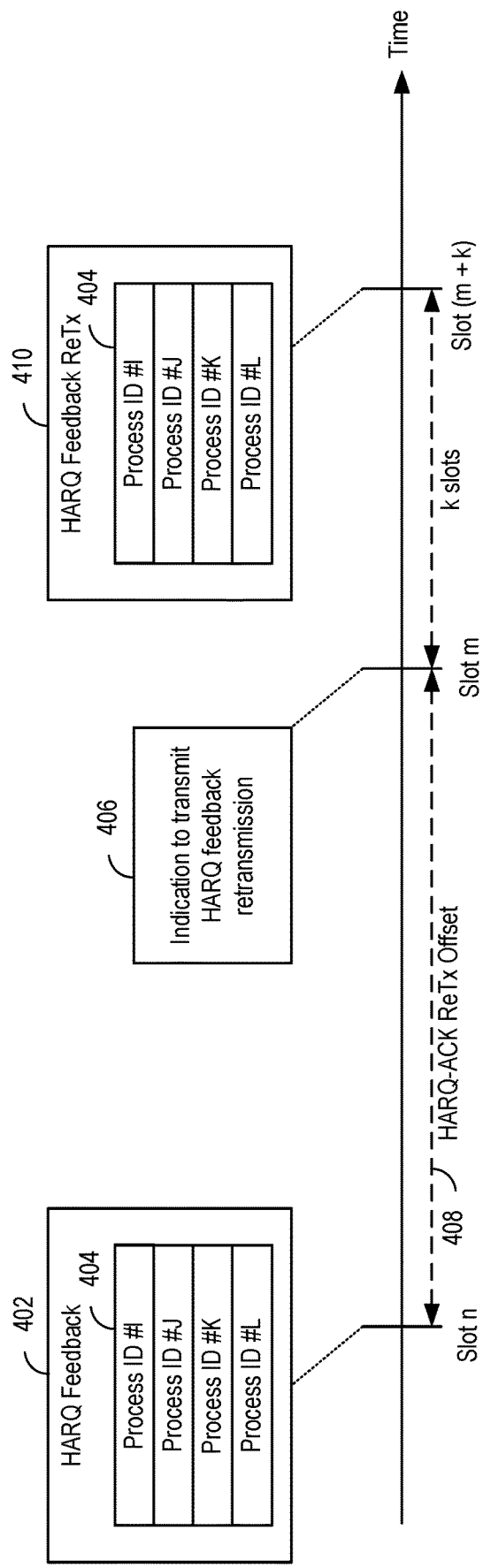
FIG. 4 is a timing diagram illustrating an example of a hybrid automatic repeat request (HARQ) feedback retransmission at a user equipment.

FIG. 4 is a timing diagram illustrating an example of a HARQ feedback retransmission at a UE. In this example, the UE may be scheduled to transmit HARQ feedback 402 in slot n. In certain cases, the HARQ feedback 402 may identify ACK-NACK information associated with downlink transmissions from the network. For example, the HARQ feedback 402 may identify a list of one or more HARQ process identifiers (IDs) 404 as indications of an ACK or a NACK associated with the corresponding HARQ process. In some cases, the network may decide to schedule the HARQ feedback 402 for a retransmission, for example, due to the HARQ feedback 402 being canceled at the UE and/or network.

The UE may receive an indication 406 to transmit a HARQ feedback retransmission in slot m. In some cases, DCI may carry the indication 406 to trigger the HARQ feedback retransmission. The triggering DCI may dynamically indicate a time offset 408 indicative of a number of PUCCH slots/sub-slots between the triggering DCI and the PUCCH slot/sub-slot of the HARQ-ACK codebook to be re-transmitted. Such a time offset may be referred to as a HARQ feedback retransmission offset or a HARQ-ACK codebook retransmission offset. The triggering DCI may indicate to transmit the HARQ feedback retransmission in slot/sub-slot m+k and indicate the HARQ feedback retransmission offset. The PUCCH slot/sub-slot n of the HARQ feedback to be retransmitted may be determined according to the following expression:

$$n = m - \text{HARQ\_retx\_offset}$$

where HARQ_retx_offset is the time offset 408, n is the slot associated with the HARQ feedback, and m is the slot in which the DCI triggering the HARQ feedback retransmission is received. It will be appreciated that usage of slots as a time domain resource unit is merely an example, and other suitable time domain resources units may be used, such as sub-slots, symbols, etc. In the DCI, the time offset 408 may be indicated as a value of a multi-bit field associated with a range of values. For example, the time offset 408 may have a value of −7 slots to 24 slots, which may correspond to a five-bit field, where '00000' may represent the lowest value (−7) of the time offset, '11111' may represent the highest value (24) of the time offset, and so on for the values between '00000' and '11111'. It will be appreciated that a negative value for the time offset may be indicative of the HARQ feedback 402 being scheduled in a slot after the triggering DCI (e.g., the DCI carrying the indication 406) is received. In certain cases, the range of values for the time offset 408 supported by a UE may be signalled to the network in a UE capability report. The UE may identify the HARQ feedback 402 for retransmission based on slot n matching the time position in which the HARQ feedback 402 was scheduled. The UE may transmit a HARQ feedback retransmission 410 in slot m+k, where the HARQ feedback retransmission 410 may carry the same HARQ feedback information as the HARQ feedback 402, such as the list of HARQ process IDs 404.

Aspects Related to HARQ Feedback Retransmission

Aspects of the present disclosure provide methods and apparatus for indicating a HARQ feedback retransmission. In certain cases, the DCI triggering the HARQ feedback retransmission may have a cyclic redundancy check (CRC) scrambled with a cell random network identifier (C-RNTI). In such cases, a specific field (e.g., a modulation and coding scheme (MCS) field associated with transport block 1) in the triggering DCI may be interpreted as the HARQ feedback retransmission offset, if the DCI indicates to transmit a HARQ feedback retransmission. The C-RNTI may be a UE-specific RNTI to facilitate scheduling of unicast transmissions to the UE, for example. In some cases, the DCI triggering the HARQ feedback retransmission may have a CRC scrambled with a configured scheduling RNTI (CS-RNTI). In such cases, the triggering DCI may be allowed or not allowed to indicate releasing (e.g., deactivation) of semi-persistent scheduling (SPS). The CS-RNTI may be used for activating or releasing periodic transmissions, such as SPS for downlink transmissions and/or a configured grant (CG) for uplink transmissions.

The HARQ feedback retransmission described herein may enable improved wireless communication performance, for example, lower latencies and/or higher throughput. For example, a HARQ feedback retransmission may enable a network to prioritize other communications (e.g., URLLC) over receiving certain HARQ feedback and dynamically request the HARQ feedback retransmission.

Figure 5:
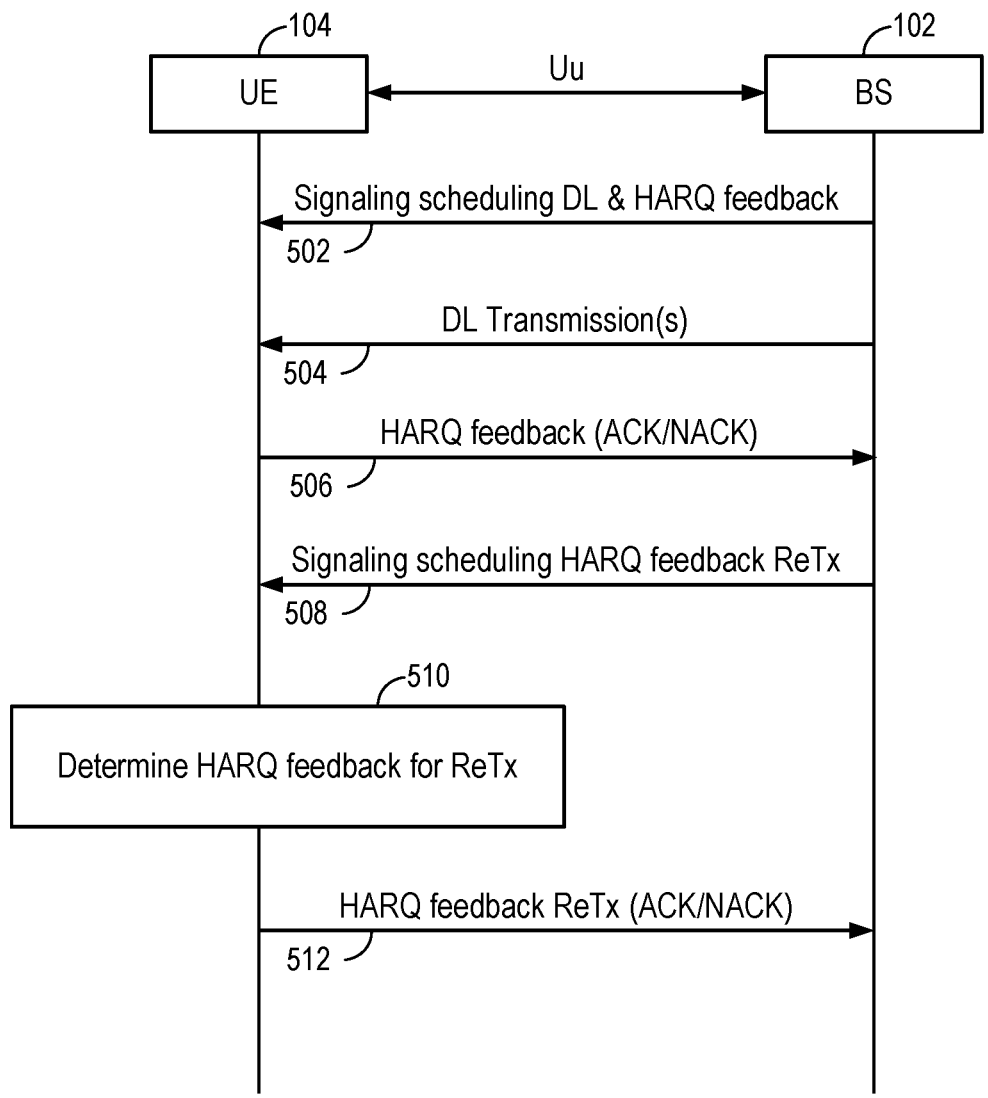
FIG. 5 is a signaling flow diagram illustrating example communications of a HARQ feedback retransmission.

FIG. 5 is a signaling flow diagram illustrating example communications of a HARQ feedback retransmission. At activity 502, the UE 104 may receive, from the BS 102, signaling (e.g., DCI) scheduling one or more downlink transmissions as well as PUCCH resources for HARQ feedback associated with the downlink transmission(s).

At activity 504, the UE 104 may receive, from the BS 102, the downlink transmission(s) scheduled at activity 502. For example, the UE 104 may receive downlink data from the BS 102.

Optionally, at activity 506, the UE 104 may transmit, to the BS 102, the HARQ feedback associated with the downlink transmission(s). The HARQ feedback may indicate whether the downlink transmission(s) were successfully decoded at the UE 104. As an example, the UE 104 may be scheduled to transmit the HARQ feedback in slot n, for example, as depicted in FIG. 4.

At activity 508, the UE 104 may receive, from the BS 102, signaling scheduling a HARQ feedback retransmission associated with the downlink transmission(s). In some cases, the signaling may indicate to reschedule a HARQ feedback transmission yet to be transmitted or previously canceled. In certain cases, the signaling may indicate to retransmit a HARQ feedback transmission. The UE 104 may receive the signaling scheduling the HARQ feedback retransmission in slot m, for example, as depicted in FIG. 4. In some cases, the BS 102 and/or the UE 104 may cancel the HARQ feedback scheduled for transmission at activity 506. The BS 102 may decide not to receive the HARQ feedback at activity 506, for example, due to other higher priority communications (e.g., URLLC). Additionally, or alternatively, the UE 104 may decide not to transmit the HARQ feedback at activity 506, for example, due to other higher priority communications (e.g., URLLC).

At activity 510, the UE 104 may determine the HARQ feedback for retransmission, for example, based on a time offset indicated in the signaling at activity 508. For example, the signaling triggering the HARQ feedback retransmission may identify the HARQ feedback scheduled for transmission in slot n based on the time offset relative to when the signaling triggering the HARQ feedback retransmission is received (slot m), for example, as described herein with respect to FIG. 4. The time offset may be indicated as a value of a multi-bit field, such as the MCS field of transport block 1 in DCI, as further described herein with respect FIG. 6A.

At activity 512, the UE 104 may transmit, to the BS 102, the HARQ feedback retransmission, for example, in slot m+k as depicted in FIG. 4. The HARQ feedback may include ACK-NACK states associated with one or more transmission, such as the transmissions received at activity 504.

In certain aspects, DCI having a CRC scrambled with a C-RNTI may use the MCS field in transport block 1 to indicate the HARQ feedback retransmission offset or secondary cell dormancy. If the DCI indicates to transmit a HARQ feedback retransmission, the MCS field may be interpreted as indicating the HARQ feedback retransmission offset (e.g., the time offset 408). For example, if the DCI field or bit indicating whether to transmit the HARQ feedback retransmission is set to a value (e.g., 1) indicating to retransmit or reschedule the HARQ feedback, the MCS field may be interpreted as indicating the HARQ feedback retransmission offset, for example, as further described herein with respect to FIG. 6A. When the C-RNTI is used for CRC scrambling of the DCI triggering the one-shot HARQ feedback retransmission, the DCI field/bit used to indicate to transmit the HARQ feedback retransmission may be set to the value (e.g., 1) indicating to retransmit or reschedule the HARQ feedback to also trigger interpretation of the MCS field as the HARQ feedback retransmission offset. If the DCI field/bit indicating to transmit the HARQ feedback retransmission is set to the complementary value (e.g., 0) or not present, the MCS field may be interpreted as a bitmap indicating the secondary cell dormancy state(s).

For certain aspects, DCI having the CRC scrambled with a CS-RNTI may use the MCS field in transport block 1 to indicate SPS or CG release (or deactivation) or indicate the HARQ feedback retransmission offset. For example, the value of '11111' in the MCS field may be interpreted as releasing (deactivating) SPS or CG. The value of '00000' of the HARQ Process Number field may be interpreted as activating SPS or CG. In certain cases, if the DCI field or bit indicating whether to transmit the HARQ feedback retransmission is set to a value (e.g., 1) indicating to retransmit or reschedule the HARQ feedback, the MCS field may be interpreted as indicating the HARQ feedback retransmission offset and not be allowed to indicate release of SPS or CG.

In some cases, if the DCI field or bit indicating whether to transmit the HARQ feedback retransmission is set to the value (e.g., 1) indicating to retransmit or reschedule the HARQ feedback, the MCS field may be allowed to indicate release of SPS or CG. For example, the MCS value of '11111' may be interpreted as releasing SPS, and the remaining values of the MCS field may be interpreted as indicating the HARQ feedback transmission offset. The UE may be configured with one value removed from the range of values for the HARQ feedback retransmission offset. For example, the UE may be configured to interpret the remaining values of the MCS field as corresponding to the values of −7 slots to 23 slots, where the value 24 is removed from the range of values for the HARQ feedback retransmission offset. In certain cases, other field(s) may be used to indicate the HARQ feedback transmission offset, for example, as further described herein with respect to FIG. 6B.

Figures 6A, 6B:
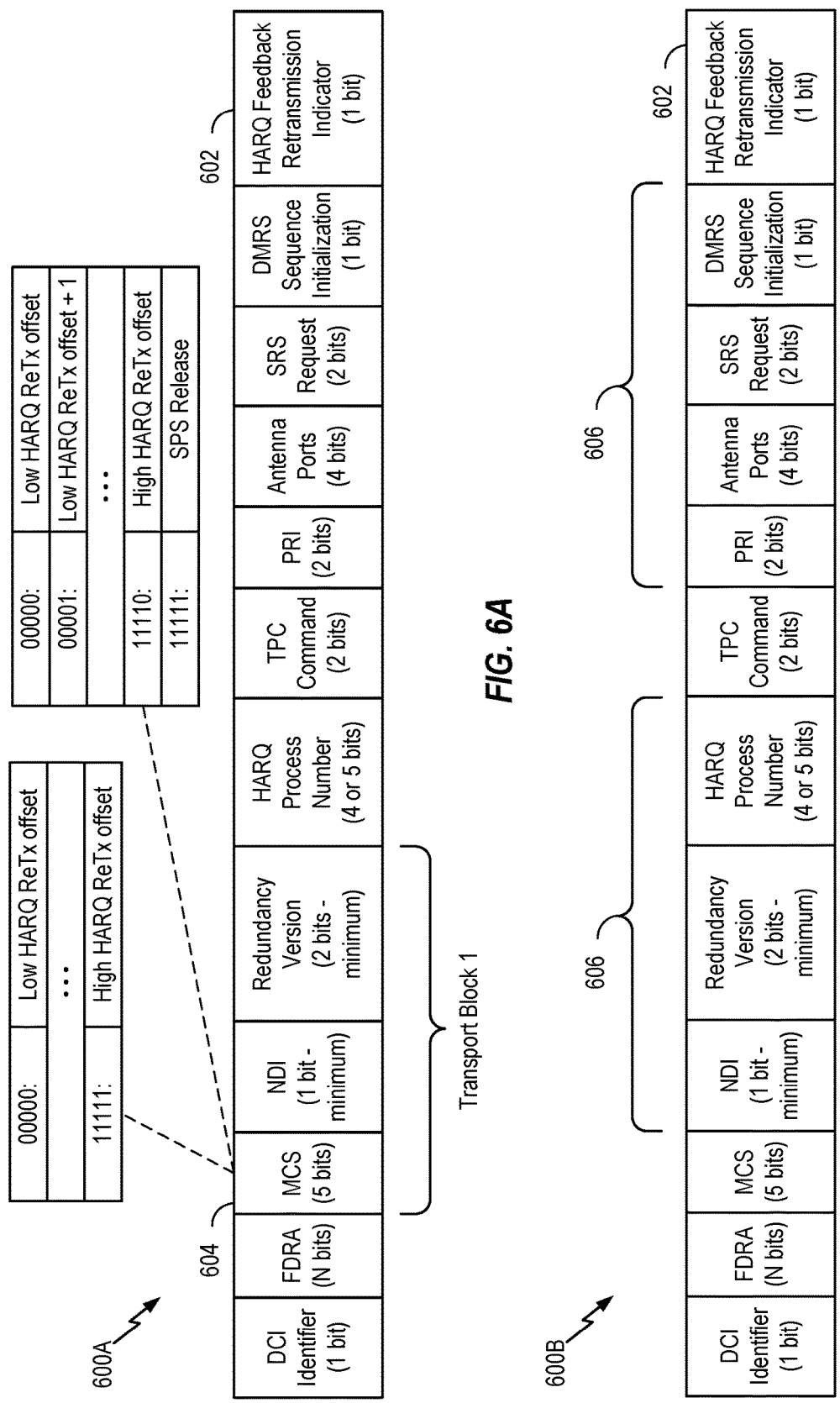
FIGS. 6A and 6B are diagrams illustrating example downlink control information (DCI) formats.

FIG. 6A is a diagram illustrating an example DCI format 600A, in accordance with certain aspects of the present disclosure. In this example, the DCI format 600A may include a DCI format 1_1 or a DCI format 1_2 used for scheduling of one or multiple physical downlink shared channels (PDSCHs) in a cell. In certain cases, the DCI format(s) 1_1 and/or 1_2 may be used to schedule a HARQ feedback retransmission instead of a downlink transmission. The DCI format 600A may include various fields, including, for example, a DCI identifier field, a frequency domain resource assignment (FDRA) field, fields for transport block 1 and/or transport block 2 (including the MCS field, a new data indicator (NDI) field, and a redundancy version field), a HARQ Process Number (HPN) field, a transmit power control (TPC) command field, a PUCCH resource indicator (PRI) field, an antenna ports field, a sounding reference signal (SRS) field, a demodulation reference signal (DMRS) sequence initialization field, and/or a HARQ feedback retransmission indicator field (which may also be referred to as a HARQ-ACK retransmission indicator). Each of the fields may be allocated a certain number of bits as illustrated.

If the CRC of the DCI format 600A is scrambled with the C-RNTI, and if the HARQ feedback retransmission indicator field 602 is set to a certain value (e.g., 1) indicating to transmit the HARQ feedback retransmission, the MCS field 604 of transport block 1 may be interpreted as the HARQ feedback retransmission offset (e.g., the time offset 408). For example, the value of '00000' for the MCS field 604 may correspond to the lowest value (e.g., −7 slots) for the HARQ feedback retransmission offset, the value of '11111' for the MCS field 604 may correspond to the largest value (e.g., 24 slots) for the HARQ feedback retransmission.

If the CRC of the DCI format 600A is scrambled with the CS-RNTI, and if the HARQ feedback retransmission indicator field 602 is set to a certain value (e.g., 1) indicating to transmit the HARQ feedback retransmission, the MCS field 604 may be allowed to indicate release of SPS. For example, the value of '11111' for the MCS field 604 may indicate release of SPS or CG; and the remaining values ('00000', '00001', . . . , '11110') for the MCS field 604 may be used to indicate the HARQ feedback retransmission offset. As an example, the value of '00000' for the MCS field 604 may indicate −7 slots for the HARQ feedback transmission offset, and the value of '11110' for the MCS field 604 may indicate 23 slots for the HARQ feedback transmission offset.

FIG. 6B is a diagram illustrating an example DCI format 600B, in accordance with certain aspects of the present disclosure. In this example, the DCI format 600B may include a DCI format 1_1 or a DCI format 1_2 used to schedule a HARQ feedback retransmission. If the CRC of the DCI format 600B is scrambled with the CS-RNTI, and if the HARQ feedback retransmission indicator field 602 is set to a certain value (e.g., 1) indicating to transmit the HARQ feedback retransmission, the MCS field 604 may be allowed to indicate release of SPS or CG, and other field(s) 606 may be used to indicate the HARQ feedback retransmission offset. For example, the other field(s) 606 used to indicate the HARQ feedback retransmission offset may include the NDI field associated with transport block 1, the redundancy version field associated with transport block 1, the HARQ process number field, the antenna ports field, the SRS request field, the DMRS sequence initialization field, or any combination thereof. Assuming the HARQ feedback retransmission offset corresponds to a value of 32 values, any 5 bits from the other field(s) 606 may be used to indicate the HARQ feedback retransmission offset. In some cases, the HARQ feedback retransmission offset may correspond to other ranges of values, such as ranges represented by 1 bit, 2 bits, 3 bits, or 4 bits, for example.

Figure 7:
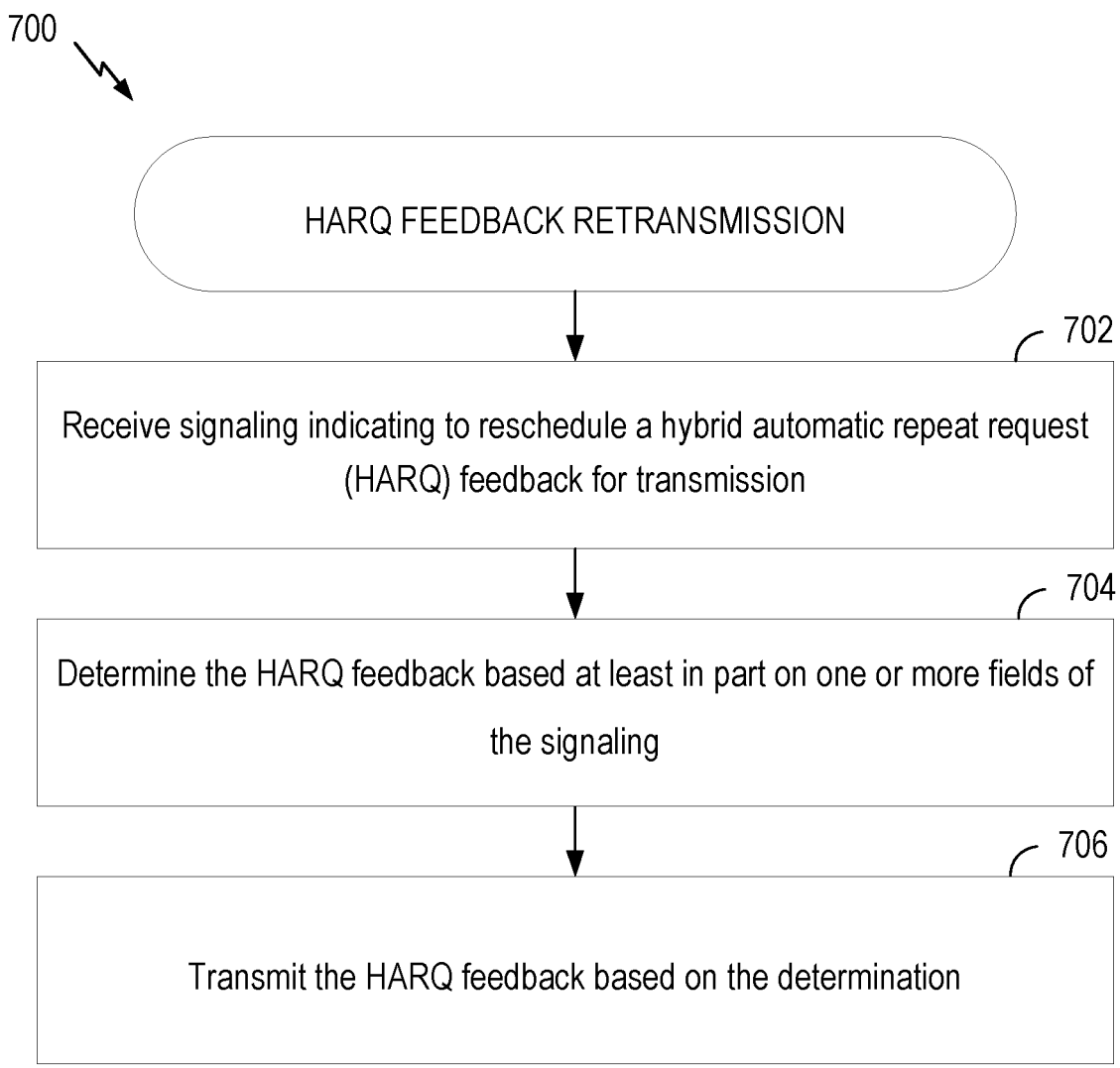
FIG. 7 is a flow diagram illustrating example operations for wireless communication by a user equipment.

FIG. 7 is a flow diagram illustrating example operations 700 for wireless communication, in accordance with certain aspects of the present disclosure. The operations 700 may be performed, for example, by a UE (such as the UE 104 in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may optionally begin, at block 702, where the UE may receive signaling indicating to reschedule HARQ feedback for transmission. The UE may receive the signaling from a network entity, such as the BS 102. The signaling may include control signaling such as DCI, RRC signaling, medium access control (MAC) signaling, and/or system information. As an example, the signaling may include the DCI format 600A and/or the DCI format 600B. The DCI format may have a HARQ feedback retransmission indicator (e.g., the HARQ feedback retransmission indicator 602) set to a value indicating to transmit a HARQ feedback retransmission and/or reschedule the HARQ feedback for transmission. In certain cases, the signaling may include first signaling and second signaling. The UE may be receiving the first signaling scheduling the HARQ feedback for transmission, such as DCI that schedules a downlink assignment with resources for HARQ feedback, as described herein with respect to activity 502 depicted in FIG. 5. The UE may receive the second signaling indicating to reschedule the HARQ feedback, such as DCI that schedules the HARQ feedback retransmission, as described herein with respect to activity 508 depicted in FIG. 5.

At block 704, the UE may determine the HARQ feedback based at least in part on one or more fields of the signaling. The UE may determine the HARQ feedback for retransmission and/or rescheduling based on a time offset (e.g., the time offset 408) associated with the HARQ feedback indicated in the signaling, for example, as described herein with respect to FIGS. 4, 6A, and 6B. For example, the second signaling may identify the time offset in an MCS field associated with transport block 1 and/or other fields in a DCI format. The UE may determine the time offset associated with the HARQ feedback based on the field(s) of the second signaling. The UE may identify the HARQ feedback based on a first time position (e.g., slot n) associated with the time offset relative to when the second signaling is received (e.g., slot m) matching a second time position (e.g., slot n) associated with when the HARQ feedback was scheduled for transmission by the first signaling. The UE may identify the HARQ feedback for transmission based on n=m−HARQ_retx_offset, for example, as described herein with respect to FIG. 4.

At block 706, the UE may transmit the HARQ feedback based on the determination. For example, the UE may transmit the HARQ feedback to the network entity as described herein with respect to FIG. 5.

In certain aspects, DCI having a CRC scrambled with a C-RNTI may use the MCS field in transport block 1 to indicate the HARQ feedback retransmission offset or secondary cell dormancy state(s). If a CRC of the signaling (e.g., the second signaling) is scrambled with a C-RNTI, the signaling may include a field (e.g., HARQ feedback retransmission indicator field 602) set to a value (e.g., 1) indicating to transmit the HARQ feedback as a retransmission or rescheduled transmission. The one or more fields may include a MCS field associated with a transport block (e.g., transport block 1). If the CRC of the signaling (e.g., the second signaling) is scrambled with the C-RNTI, and if the field is set to a certain value (e.g., 1) indicating to transmit the HARQ feedback as a retransmission or rescheduled transmission, the UE may interpret the MCS field as the HARQ feedback retransmission offset (e.g., the time offset 408).

For certain aspects, DCI having the CRC scrambled with a CS-RNTI may use the MCS field in transport block 1 to indicate to release SPS or indicate the HARQ feedback retransmission offset. In certain cases, if a CRC of the signaling (e.g., the second signaling) is scrambled with a CS-RNTI, the signaling may not be allowed to indicate release of SPS. If the CRC of the signaling (e.g., the second signaling) is scrambled with the CS-RNTI, and if a field (e.g., HARQ feedback retransmission indicator field 602) in the signaling is set to a value (e.g., 1) indicating to transmit the HARQ feedback as a retransmission or a rescheduled transmission, the UE may interpret the MCS field associated with transport block 1 as indicating the HARQ feedback retransmission offset, and the MCS field may not be allowed to indicate release of SPS.

In certain aspects, if a CRC of the signaling is scrambled with a CS-RNTI, the signaling (e.g., the second signaling) is allowed to indicate release of SPS. In some cases, if the CRC of the signaling (e.g., the second signaling) is scrambled with the CS-RNTI, and if a field (e.g., HARQ feedback retransmission indicator field 602) in the signaling is set to a value (e.g., 1) indicating to transmit the HARQ feedback as a retransmission or a rescheduled transmission, the UE may interpret the MCS field associated with transport block 1 indicating release of SPS or indicating the HARQ feedback retransmission offset. For example, the one or more fields may identify the time offset associated with the HARQ feedback or to release the SPS.

In certain cases, other field(s) may be used to indicate the HARQ feedback transmission offset, for example, as described herein with respect to FIG. 6B. If the CRC of the signaling (e.g., the second signaling) is scrambled with the CS-RNTI, and if a field (e.g., HARQ feedback retransmission indicator field 602) in the signaling is set to a value (e.g., 1) indicating to transmit the HARQ feedback as a retransmission or a rescheduled transmission, the UE may interpret the MCS field associated with transport block 1 indicating release of SPS and one or more other fields as indicating the HARQ feedback retransmission offset. For example, the one or more fields may include a NDI field associated with a transport block (e.g., transport block 1), a redundancy version (RV) field associated with the transport block, a DMRS sequence initialization field, a SRS request field, or any combination thereof.

For certain aspects, the UE may receive a configuration indicating how to interpret the MCS field associated with transport block 1 of certain DCI format(s) (e.g., DCI format 1_1 and/or DCI format 1_2). In some cases, the UE may receive a configuration indicating one or more values removed from a range of values associated with the time offset. For example, the UE configuration may identify that the two highest values (e.g., 23 and 24 slots) are removed from the range of values associated with the time offset. To determine the HARQ feedback, the UE may determine the HARQ feedback based at least in part on the one or more fields of the second signaling and the configuration.

In certain aspects, the HARQ feedback may identify the ACK-NACK state associated with one or transmissions. For example, the HARQ feedback may identify the ACK-NACK state associated with specific transmissions based on the respective CBG, TB, HARQ process, carrier, and/or serving cell. The HARQ feedback may include one or more ACKs and/or one or more NACKs. The HARQ feedback may include one or more HARQ process IDs, for example, as a list of HARQ process IDs. For certain aspects, the HARQ feedback retransmission may be used for specific HARQ codebook types. For example, the HARQ feedback may be associated with a Type-1 HARQ-ACK codebook, a Type-2 HARQ-ACK codebook, a Type-3 HARQ-ACK codebook, an enhancement thereof, or any combination thereof.

Figure 8:
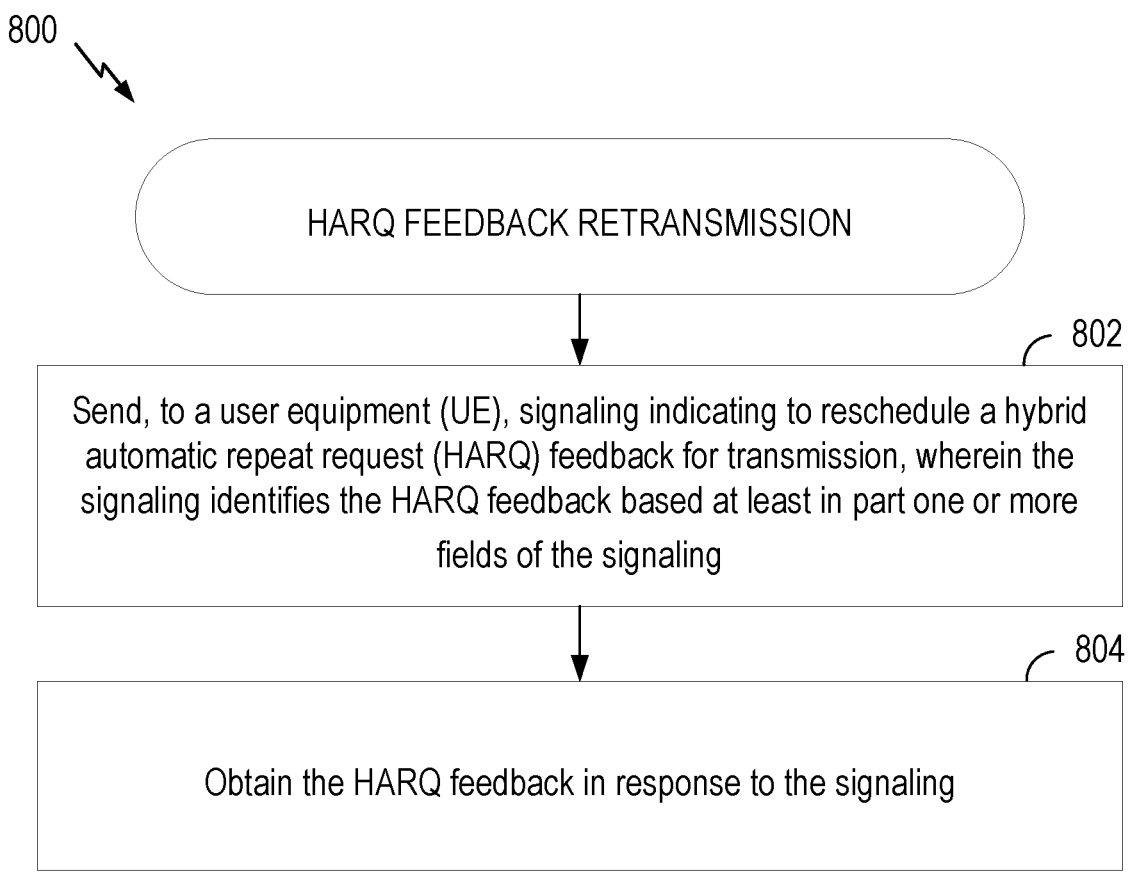
FIG. 8 is a flow diagram illustrating example operations for wireless communication by a network entity.

FIG. 8 is a flow diagram illustrating example operations 800 for wireless communication, in accordance with certain aspects of the present disclosure. The operations 800 may be performed, for example, by a network entity (such as the BS 102 in the wireless communication network 100). The operations 800 may be complementary to the operations 700 performed by the UE. The operations 800 may be implemented as software components that are executed and run on one or more processors (e.g., controller/processor 240 of FIG. 2). Further, the transmission and reception of signals by the network entity in operations 800 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, a network entity may refer to a communication device in a radio access network (RAN), such as a radio unit of a base station, a base station, and/or a network controller, which may control the operations of one or more base stations and/or one or more units of a base station. A network entity may be implemented as a device or unit of a disaggregated base station or disaggregated RAN.

The operations 800 may optionally begin, at block 802, where the network entity may send (e.g., transmit, provide, and/or output), to a UE (e.g., the UE 104), signaling indicating to reschedule a HARQ feedback for transmission. The signaling may identify the HARQ feedback based at least in part on one or more fields of the signaling. The signaling may include first signaling and second signaling. The network entity may send, to the UE, first signaling scheduling the HARQ feedback for transmission, such as DCI that schedules a downlink assignment with resources for HARQ feedback, as described herein with respect to activity 502 depicted in FIG. 5. The network entity may send, to the UE, second signaling indicating to reschedule the HARQ feedback. The second signaling may identify a time offset (e.g., the time offset 408) associated with the HARQ feedback based on the one or more fields of the second signaling. A first time position (e.g., slot n) associated with the time offset relative to when the second signaling is sent (e.g., slot m) may match a second time position (e.g., slot n) associated with when the HARQ feedback was scheduled for transmission by the first signaling.

At block 802, the network entity may obtain the HARQ feedback in response to the signaling. For example, the network entity may receive the HARQ feedback from the UE as described herein with respect to FIG. 5.

In aspects, the signaling may be formatted as described herein with respect to FIGS. 6A, 6B, and 7. In some cases, if a CRC of the signaling (e.g., the second signaling) is scrambled with a C-RNTI, the signaling may include a field (e.g., HARQ feedback retransmission indicator field 602) set to a value (e.g., 1) indicating to transmit the HARQ feedback as a retransmission or rescheduled transmission, for example, as described herein with respect to FIG. 6A. In certain cases, if a CRC of the signaling (e.g., the second signaling) is scrambled with a CS-RNTI, the signaling is not allowed to indicate release of SPS, for example, as described herein with respect to FIG. 7. In some cases, if a CRC of the signaling (e.g., the second signaling) is scrambled with a CS-RNTI, the signaling is allowed to indicate release of SPS, for example, as described herein with respect to FIGS. 6A, 6B, and 7.

For certain aspects, the network entity may send a configuration indicating how to interpret the MCS field associated with transport block 1 of certain DCI format(s) (e.g., DCI format 1_1 and/or DCI format 1_2). The network entity may send, to the UE, a configuration indicating one or more values removed from a range of values associated with the time offset, and the second signaling may identify the time offset based at least in part on the one or more fields of the second signaling and the configuration.

In certain aspects, the HARQ feedback may identify the ACK-NACK state associated with one or transmissions, for example, as described herein with respect to FIG. 7. For certain aspects, the HARQ feedback retransmission may be used for specific HARQ codebook types, for example, as described herein with respect to FIG. 7.

Example Wireless Communication Devices

Figure 9:
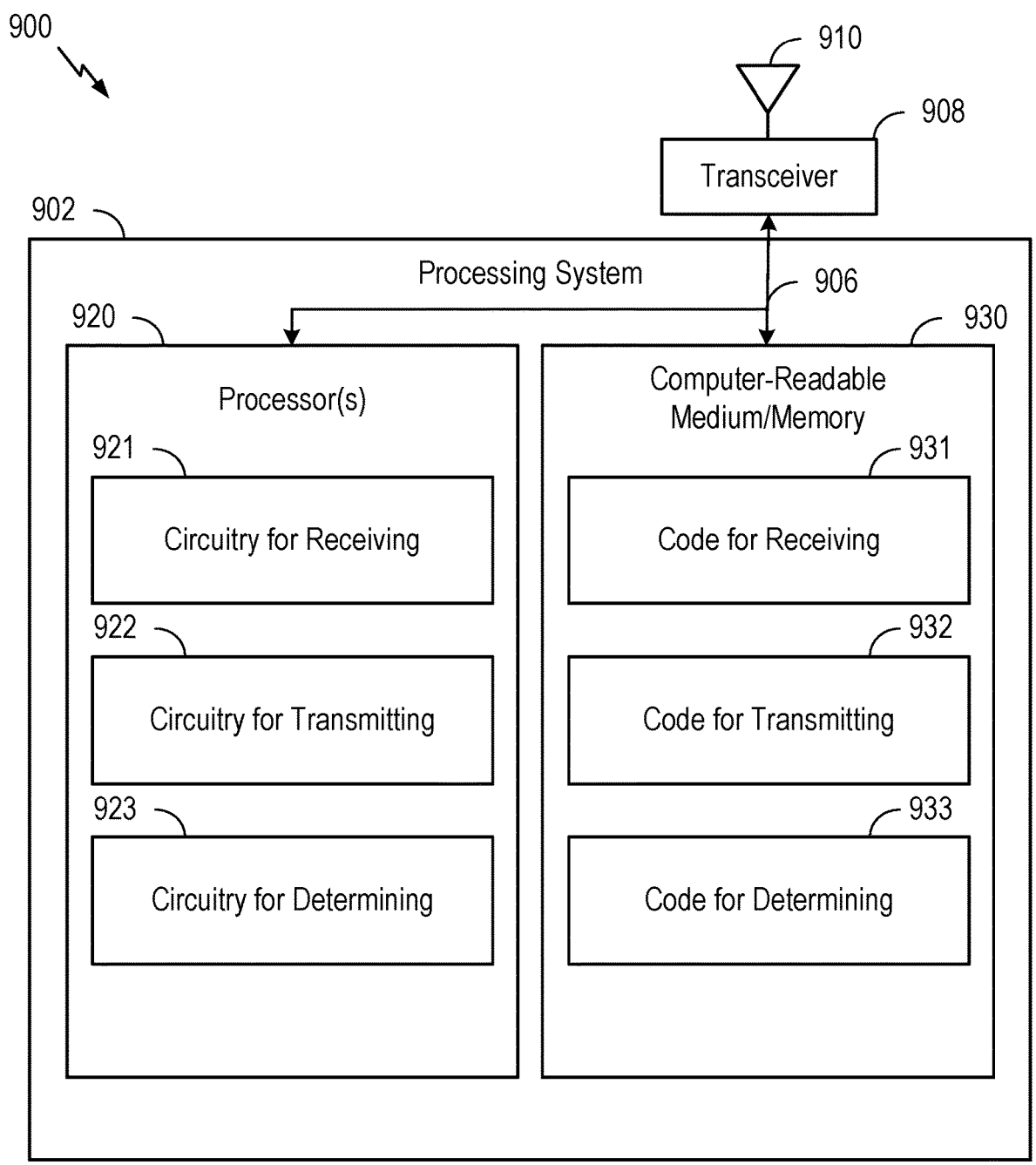
FIG. 9 depicts aspects of an example communications device.

FIG. 9 depicts an example communications device 900 that includes various components operable, configured, or adapted to perform operations for the techniques disclosed herein, such as the operations depicted and described with respect to FIGS. 5-7. In some examples, communication device 900 may be a UE 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 5-7, or other operations for performing the various techniques discussed herein for retransmission or rescheduling of HARQ feedback.

In the depicted example, computer-readable medium/memory 930 stores code 931 for receiving, code 932 for transmitting, and/or code 933 for determining.

In the depicted example, the one or more processors 920 include circuitry configured to implement the code stored in the computer-readable medium/memory 930, including circuitry 921 for receiving, circuitry 922 for transmitting, and/or circuitry 923 for determining.

Various components of communications device 900 may provide means for performing the methods described herein, including with respect to FIGS. 5-7.

In some examples, means for transmitting or sending (or means for outputting for transmission) may include the transceivers 254 and/or antenna(s) 252 of the UE 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the UE 104 illustrated in FIG. 2 and/or transceiver 908 and antenna 910 of the communication device 900 in FIG. 9.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for transmitting, means for receiving, and/or means for determining and/or identifying may include various processing system components, such as: the one or more processors 920 in FIG. 9, or aspects of the UE 104 depicted in FIG. 2, including receive processor 258, transmit processor 264, TX MIMO processor 266, and/or controller/processor 280 (including HARQ feedback retransmission component 281).

Notably, FIG. 9 is an example, and many other examples and configurations of communication device 900 are possible.

Figure 10:
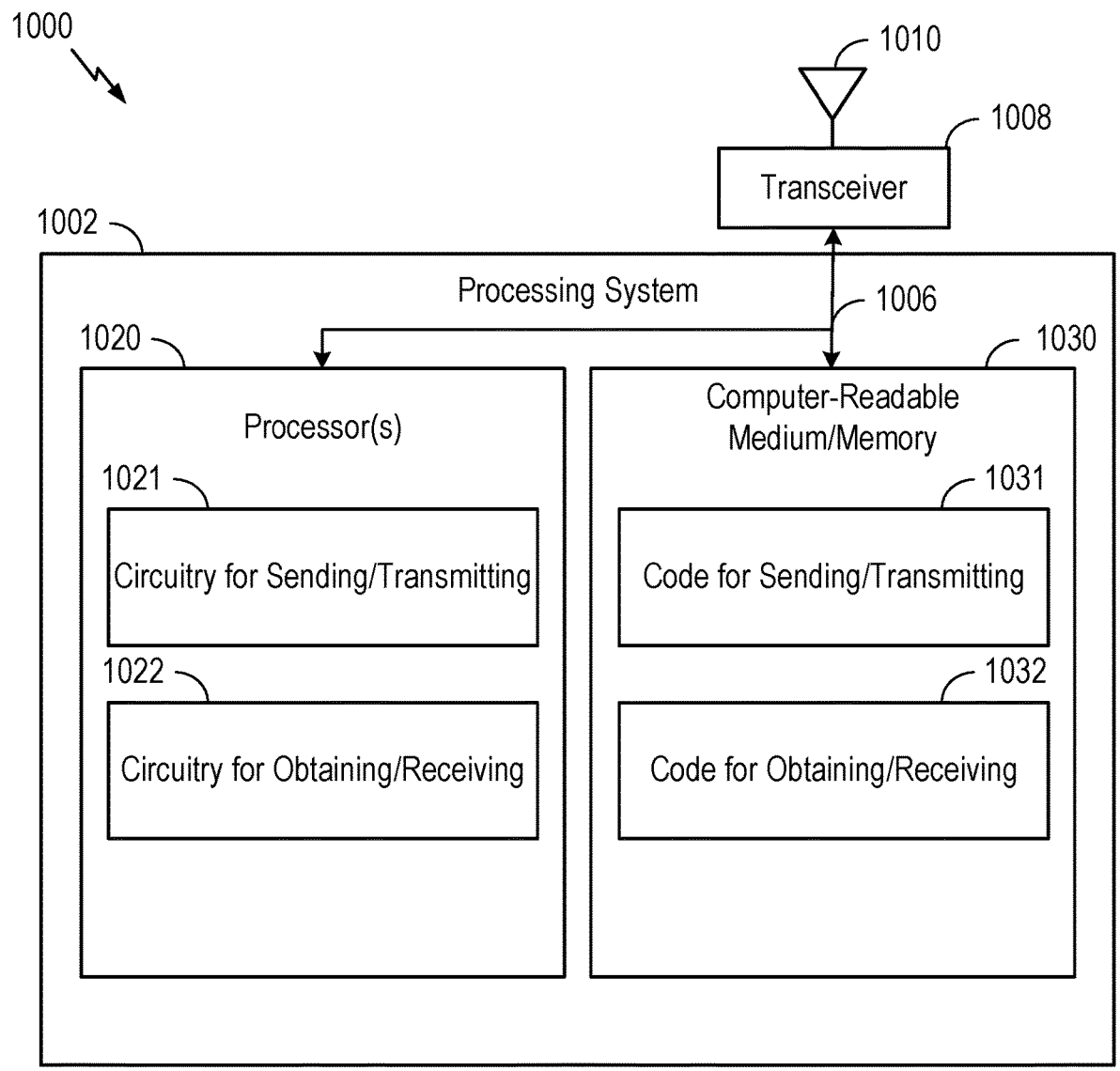
FIG. 10 depicts aspects of an example communications device.

FIG. 10 depicts an example communications device 1000 that includes various components operable, configured, or adapted to perform operations for the techniques disclosed herein, such as the operations depicted and described with respect to FIGS. 5, 6A, 6B, and 8. In some examples, communication device 1000 may be a BS 102 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 5, 6A, 6B, and 8, or other operations for performing the various techniques discussed herein for retransmission or rescheduling of HARQ feedback.

In the depicted example, computer-readable medium/memory 1030 stores code 1031 for sending (or transmitting) and/or code 1032 for obtaining (or receiving).

In the depicted example, the one or more processors 1020 include circuitry configured to implement the code stored in the computer-readable medium/memory 1030, including circuitry 1021 for sending (or transmitting) and/or circuitry 1022 for obtaining (or receiving).

Various components of communications device 1000 may provide means for performing the methods described herein, including with respect to FIGS. 5, 6A, 6B, and 8.

In some examples, means for transmitting or sending (or means for outputting for transmission) may include the transceivers 232 and/or antenna(s) 234 of the BS 102 illustrated in FIG. 2 and/or transceiver 1008 and antenna 1010 of the communication device 1000 in FIG. 10.

In some examples, means for receiving (or means for obtaining) may include the transceivers 232 and/or antenna(s) 234 of the base station illustrated in FIG. 2 and/or transceiver 1008 and antenna 1010 of the communication device 1000 in FIG. 10.

In some examples, means for transmitting and/or means for receiving may include various processing system components, such as: the one or more processors 1020 in FIG. 10, or aspects of the BS 102 depicted in FIG. 2, including receive processor 238, transmit processor 220, TX MIMO processor 230, and/or controller/processor 240 (including HARQ feedback retransmission component 241).

Notably, FIG. 10 is an example, and many other examples and configurations of communication device 1000 are possible.

Example Aspects

Implementation examples are described in the following numbered clauses:

Aspect 1: A method of wireless communication by a user equipment, comprising: receiving signaling indicating to reschedule hybrid automatic repeat request (HARQ) feedback for transmission; determining the HARQ feedback based at least in part on one or more fields of the signaling; and transmitting the HARQ feedback based on the determination.

Aspect 2: The method of Aspect 1, wherein: receiving the signaling comprises: receiving first signaling scheduling the HARQ feedback for transmission; and receiving second signaling indicating to reschedule the HARQ feedback; and determining the HARQ feedback comprises: determining a time offset associated with the HARQ feedback based on the one or more fields of the second signaling; and identifying the HARQ feedback based on a first time position associated with the time offset relative to when the second signaling is received matching a second time position associated with when the HARQ feedback was scheduled for transmission by the first signaling.

Aspect 3: The method of Aspect 1 or 2, wherein if a cyclic redundancy check (CRC) of the signaling is scrambled with a cell radio network temporary identifier (C-RNTI), the signaling includes a field set to a value indicating to transmit the HARQ feedback.

Aspect 4: The method according to any of Aspects 1-3, wherein the one or more fields includes a modulation and coding scheme field associated with a transport block.

Aspect 5: The method of Aspect 1 or 2, wherein if a CRC of the signaling is scrambled with a configured scheduling RNTI (CS-RNTI), the signaling is not allowed to indicate release of semi-persistent scheduling.

Aspect 6: The method of Aspect 2, wherein if a CRC of the signaling is scrambled with a CS-RNTI, the signaling is allowed to indicate release of semi-persistent scheduling.

Aspect 7: The method of Aspect 6, wherein the one or more fields identify the time offset associated with the HARQ feedback or to release the semi-persistent scheduling.

Aspect 8: The method of Aspect 6 or 7, further comprising: receiving a configuration indicating one or more values removed from a range of values associated with the time offset; and wherein determining the HARQ feedback comprises determining the HARQ feedback based at least in part on the one or more fields of the second signaling and the configuration.

Aspect 9: The method according to any of Aspects 6-8, wherein the one or more fields includes: a new data indicator (NDI) field associated with a transport block; a redundancy version (RV) field associated with the transport block; a demodulation reference signal (DMRS) sequence initialization field; a sounding reference signal (SRS) request field; or any combination thereof.

Aspect 10: The method according to any of Aspects 1-9, wherein the signaling includes downlink control information.

Aspect 11: The method according to any of Aspects 1-10, wherein the HARQ feedback includes one or more acknowledgements or one or more negative acknowledgments.

Aspect 12: The method according to any of Aspects 1-11, wherein the HARQ feedback includes one or more HARQ process identifiers.

Aspect 13: The method according to any of Aspects 1-12, wherein the HARQ feedback is associated with a Type-1 or a Type-2 HARQ-Acknowledgement (HARQ-ACK) codebook.

Aspect 14: A method of wireless communication by a network entity, comprising: sending, to a user equipment (UE), signaling indicating to reschedule hybrid automatic repeat request (HARQ) feedback for transmission, wherein the signaling identifies the HARQ feedback based at least in part on one or more fields of the signaling; and obtaining the HARQ feedback in response to the signaling.

Aspect 15: The method of Aspect 14, wherein sending the signaling comprises: sending, to the UE, first signaling scheduling the HARQ feedback for transmission; and sending, to the UE, second signaling indicating to reschedule the HARQ feedback, wherein the second signaling identifies a time offset associated with the HARQ feedback based on the one or more fields of the second signaling, wherein a first time position associated with the time offset relative to when the second signaling is sent matches a second time position associated with when the HARQ feedback was scheduled for transmission by the first signaling.

Aspect 16: The method of Aspect 14 or 15, wherein if a cyclic redundancy check (CRC) of the signaling is scrambled with a cell radio network temporary identifier (C-RNTI), the signaling includes a field set to a value indicating to transmit the HARQ feedback.

Aspect 17: The method according to any of Aspects 14-16, wherein the one or more fields includes a modulation and coding scheme field associated with a transport block.

Aspect 18: The method of Aspect 14 or 15, wherein if a CRC of the signaling is scrambled with a configured scheduling RNTI (CS-RNTI), the signaling is not allowed to indicate release of semi-persistent scheduling.

Aspect 19: The method of Aspect 15, wherein if a CRC of the signaling is scrambled with a CS-RNTI, the signaling is allowed to indicate release of semi-persistent scheduling.

Aspect 20: The method of Aspect 19, wherein the one or more fields identify the time offset associated with the HARQ feedback or to release the semi-persistent scheduling.

Aspect 21: The method of Aspect 19 or 20, further comprising: sending, to the UE, a configuration indicating one or more values removed from a range of values associated with the time offset; and wherein the second signaling identifies the time offset based at least in part on the one or more fields of the second signaling and the configuration.

Aspect 22: The method according to any of Aspects 19-21, wherein the one or more fields includes: a new data indicator (NDI) field associated with a transport block; a redundancy version (RV) field associated with the transport block; a demodulation reference signal (DMRS) sequence initialization field; a sounding reference signal (SRS) request field; or any combination thereof.

Aspect 23: The method according to any of Aspects 14-22, wherein the signaling includes downlink control information.

Aspect 24: The method according to any of Aspects 14-23, wherein the HARQ feedback includes one or more acknowledgements or one or more negative acknowledgments.

Aspect 25: The method according to any of Aspects 14-24, wherein the HARQ feedback includes one or more HARQ process identifiers.

Aspect 26: The method according to any of Aspects 14-25, wherein the HARQ feedback is associated with a Type-1 or a Type-2 HARQ-Acknowledgement (HARQ-ACK) codebook.

Aspect 27: An apparatus for wireless communication, comprising: a memory; and a processor coupled to the memory, the processor being configured to: receive signaling indicating to reschedule hybrid automatic repeat request (HARQ) feedback for transmission, determine the HARQ feedback based at least in part on one or more fields of the signaling, and transmit the HARQ feedback based on the determination.

Aspect 28: The apparatus of Aspect 27, wherein: to receive the signaling, the processor is further configured to receive first signaling scheduling the HARQ feedback for transmission; and receive second signaling indicating to reschedule the HARQ feedback; and to determine the HARQ feedback, the processor is further configured to determine a time offset associated with the HARQ feedback based on the one or more fields of the second signaling; and identify the HARQ feedback based on a first time position associated with the time offset relative to when the second signaling is received matching a second time position associated with when the HARQ feedback was scheduled for transmission by the first signaling.

Aspect 29: The apparatus of Aspect 27 or 28, wherein if a cyclic redundancy check (CRC) of the signaling is scrambled with a cell radio network temporary identifier (C-RNTI), the signaling includes a field set to a value indicating to transmit the HARQ feedback.

Aspect 30: The apparatus according to any of Aspects 27-29, wherein the one or more fields includes a modulation and coding scheme field associated with a transport block.

Aspect 31: The apparatus of Aspect 27 or 28, wherein if a CRC of the signaling is scrambled with a configured scheduling RNTI (CS-RNTI), the signaling is not allowed to indicate release of semi-persistent scheduling.

Aspect 32: The apparatus of Aspect 28, wherein if a CRC of the signaling is scrambled with a CS-RNTI, the signaling is allowed to indicate release of semi-persistent scheduling.

Aspect 33: The apparatus of Aspect 32, wherein the one or more fields identify the time offset associated with the HARQ feedback or to release the semi-persistent scheduling.

Aspect 34: The apparatus of Aspect 32 or 33, wherein: the processor is further configured to receive a configuration indicating one or more values removed from a range of values associated with the time offset; and to determine the HARQ feedback, the processor is further configured to determine the HARQ feedback based at least in part on the one or more fields of the second signaling and the configuration.

Aspect 35: The apparatus according to any of Aspects 32-34, wherein the one or more fields includes: a new data indicator (NDI) field associated with a transport block; a redundancy version (RV) field associated with the transport block; a demodulation reference signal (DMRS) sequence initialization field; a sounding reference signal (SRS) request field; or any combination thereof.

Aspect 36: The apparatus according to any of Aspects 27-35, wherein the signaling includes downlink control information.

Aspect 37: The apparatus according to any of Aspects 27-36, wherein the HARQ feedback includes one or more acknowledgements or one or more negative acknowledgments.

Aspect 38: The apparatus according to any of Aspects 27-37, wherein the HARQ feedback includes one or more HARQ process identifiers.

Aspect 39: The apparatus according to any of Aspects 27-38, wherein the HARQ feedback is associated with a Type-1 or a Type-2 HARQ-Acknowledgement (HARQ-ACK) codebook.

Aspect 40: An apparatus for wireless communication, comprising: a memory; and a processor coupled to the memory, the processor being configured to: send, to a user equipment (UE), signaling indicating to reschedule hybrid automatic repeat request (HARQ) feedback for transmission, wherein the signaling identifies the HARQ feedback based at least in part on one or more fields of the signaling, and obtain the HARQ feedback in response to the signaling.

Aspect 41: The apparatus of Aspect 40, wherein to send the signaling, the processor is configured to: send, to the UE, first signaling scheduling the HARQ feedback for transmission; and send, to the UE, second signaling indicating to reschedule the HARQ feedback, wherein the second signaling identifies a time offset associated with the HARQ feedback based on the one or more fields of the second signaling, wherein a first time position associated with the time offset relative to when the second signaling is sent matches a second time position associated with when the HARQ feedback was scheduled for transmission by the first signaling.

Aspect 42: The apparatus of Aspect 40 or 41, wherein if a cyclic redundancy check (CRC) of the signaling is scrambled with a cell radio network temporary identifier (C-RNTI), the signaling includes a field set to a value indicating to transmit the HARQ feedback.

Aspect 43: The apparatus according to any of Aspects 40-42, wherein the one or more fields includes a modulation and coding scheme field associated with a transport block.

Aspect 44: The apparatus of Aspect 40 or 41, wherein if a CRC of the signaling is scrambled with a configured scheduling RNTI (CS-RNTI), the signaling is not allowed to indicate release of semi-persistent scheduling.

Aspect 45: The apparatus of Aspect 41, wherein if a CRC of the signaling is scrambled with a CS-RNTI, the signaling is allowed to indicate release of semi-persistent scheduling.

Aspect 46: The apparatus of Aspect 45, wherein the one or more fields identify the time offset associated with the HARQ feedback or to release the semi-persistent scheduling.

Aspect 47: The apparatus of Aspect 45 or 46, wherein the processor is further configured to: send, to the UE, a configuration indicating one or more values removed from a range of values associated with the time offset; and wherein the second signaling identifies the time offset based at least in part on the one or more fields of the second signaling and the configuration.

Aspect 48: The apparatus according to any of Aspects 45-47, wherein the one or more fields includes: a new data indicator (NDI) field associated with a transport block; a redundancy version (RV) field associated with the transport block; a demodulation reference signal (DMRS) sequence initialization field; a sounding reference signal (SRS) request field; or any combination thereof.

Aspect 49: The apparatus according to any of Aspects 40-48, wherein the signaling includes downlink control information.

Aspect 50: The apparatus according to any of Aspects 40-49, wherein the HARQ feedback includes one or more acknowledgements or one or more negative acknowledgments.

Aspect 51: The apparatus according to any of Aspects 40-50, wherein the HARQ feedback includes one or more HARQ process identifiers.

Aspect 52: The apparatus according to any of Aspects 40-51, wherein the HARQ feedback is associated with a Type-1 or a Type-2 HARQ-Acknowledgement (HARQ-ACK) codebook.

Aspect 53: An apparatus, comprising: a memory comprising computer-executable instructions; one or more processors configured to execute the computer-executable instructions and cause the apparatus to perform a method in accordance with any of Aspects 1-26.

Aspect 54: An apparatus, comprising means for performing a method in accordance with any of Aspects 1-26.

Aspect 55: A non-transitory computer-readable medium comprising computer-executable instructions that, when executed by one or more processors of a processing system, cause the processing system to perform a method in accordance with any of Aspects 1-26.

Aspect 56: A computer program product embodied on a computer-readable storage medium comprising code for performing a method in accordance with any of Aspects 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to YMHz (e.g., 5, 10, 15, 20, 100, 400, and other MHz)

bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of communicating hybrid automatic repeat request (HARD) feedback in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include identifying, calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a user equipment, comprising:
   receiving signaling indicating to reschedule hybrid automatic repeat request (HARQ) feedback for transmission, wherein a cyclic redundancy check (CRC) of the signaling is scrambled with a cell radio network temporary identifier (C-RNTI);
   determining the HARQ feedback based at least in part on one or more fields of the signaling; and
   transmitting the HARQ feedback based on the determination.

2. The method of claim 1, wherein:
   receiving the signaling comprises:
      receiving first signaling scheduling the HARQ feedback for transmission; and
      receiving second signaling indicating to reschedule the HARQ feedback; and determining the HARQ feedback comprises:
determining a time offset associated with the HARQ feedback based on the one or more fields of the second signaling; and
identifying the HARQ feedback based on a first time position associated with the time offset relative to when the second signaling is received matching a second time position associated with when the HARQ feedback was scheduled for transmission by the first signaling.

3. The method of claim 2, wherein:
the CRC of the second signaling is scrambled with the C-RNTI; and
the second signaling includes a field set to a value indicating to transmit the HARQ feedback.

4. The method of claim 2, wherein the one or more fields identify the time offset associated with the HARQ feedback.

5. The method of claim 1, wherein the signaling includes a field set to a value indicating to transmit the HARQ feedback.

6. The method of claim 5, wherein the one or more fields includes a modulation and coding scheme field associated with a transport block.

7. The method of claim 1, wherein:
the signaling includes downlink control information;
the HARQ feedback includes one or more acknowledgements or one or more negative acknowledgments;
the HARQ feedback includes one or more HARQ process identifiers; and
the HARQ feedback is associated with a Type-1 or a Type-2 HARQ-Acknowledgement (HARQ-ACK) codebook.

8. A method of wireless communication by a network entity, comprising:
sending, to a user equipment (UE), signaling indicating to reschedule hybrid automatic repeat request (HARQ) feedback for transmission, wherein the signaling identifies the HARQ feedback based at least in part on one or more fields of the signaling, wherein a cyclic redundancy check (CRC) of the signaling is scrambled with a cell radio network temporary identifier (C-RNTI); and
obtaining the HARQ feedback in response to the signaling.

9. The method of claim 8, wherein sending the signaling comprises:
sending, to the UE, first signaling scheduling the HARQ feedback for transmission; and
sending, to the UE, second signaling indicating to reschedule the HARQ feedback, wherein the second signaling identifies a time offset associated with the HARQ feedback based on the one or more fields of the second signaling, wherein a first time position associated with the time offset relative to when the second signaling is sent matches a second time position associated with when the HARQ feedback was scheduled for transmission by the first signaling.

10. The method of claim 9, wherein:
the CRC of the second signaling is scrambled with the C-RNTI; and
the second signaling includes a field set to a value indicating to transmit the HARQ feedback.

11. The method of claim 9, wherein the one or more fields identify the time offset associated with the HARQ feedback.

12. The method of claim 8, wherein the signaling includes a field set to a value indicating to transmit the HARQ feedback.

13. The method of claim 12, wherein the one or more fields includes a modulation and coding scheme field associated with a transport block.

14. The method of claim 8, wherein:
the signaling includes downlink control information;
the HARQ feedback includes one or more acknowledgements or one or more negative acknowledgments;
the HARQ feedback includes one or more HARQ process identifiers; and
the HARQ feedback is associated with a Type-1 or a Type-2 HARQ-Acknowledgement (HARQ-ACK) codebook.

15. An apparatus for wireless communication, comprising:
a memory; and
a processor coupled to the memory, the processor being configured to:
receive signaling indicating to reschedule hybrid automatic repeat request (HARQ) feedback for transmission, wherein a cyclic redundancy check (CRC) of the signaling is scrambled with a cell radio network temporary identifier (C-RNTI),
determine the HARQ feedback based at least in part on one or more fields of the signaling, and
transmit the HARQ feedback based on the determination.

16. The apparatus of claim 15, wherein:
to receive the signaling, the processor is further configured to:
receive first signaling scheduling the HARQ feedback for transmission; and
receive second signaling indicating to reschedule the HARQ feedback; and
to determine the HARQ feedback, the processor is further configured to:
determine a time offset associated with the HARQ feedback based on the one or more fields of the second signaling; and
identify the HARQ feedback based on a first time position associated with the time offset relative to when the second signaling is received matching a second time position associated with when the HARQ feedback was scheduled for transmission by the first signaling.

17. The apparatus of claim 16, wherein:
the CRC of the second signaling is scrambled with the C-RNTI; and
the second signaling includes a field set to a value indicating to transmit the HARQ feedback.

18. The apparatus of claim 16, wherein the one or more fields identify the time offset associated with the HARQ feedback.

19. The apparatus of claim 15, wherein the signaling includes a field set to a value indicating to transmit the HARQ feedback.

20. The apparatus of claim 19, wherein the one or more fields includes a modulation and coding scheme field associated with a transport block.

21. The apparatus of claim 15, wherein:
the signaling includes downlink control information;
the HARQ feedback includes one or more acknowledgements or one or more negative acknowledgments;
the HARQ feedback includes one or more HARQ process identifiers; and
the HARQ feedback is associated with a Type-1 or a Type-2 HARQ-Acknowledgement (HARQ-ACK) codebook.

22. An apparatus for wireless communication, comprising:
  a memory; and
  a processor coupled to the memory, the processor being configured to:
    send, to a user equipment (UE), signaling indicating to reschedule hybrid automatic repeat request (HARQ) feedback for transmission, wherein the signaling identifies the HARQ feedback based at least in part on one or more fields of the signaling, wherein a cyclic redundancy check (CRC) of the signaling is scrambled with a cell radio network temporary identifier (C-RNTI), and
    obtain the HARQ feedback in response to the signaling.

23. The apparatus of claim 22, wherein to send the signaling, the processor is configured to:
  send, to the UE, first signaling scheduling the HARQ feedback for transmission; and
  send, to the UE, second signaling indicating to reschedule the HARQ feedback, wherein the second signaling identifies a time offset associated with the HARQ feedback based on the one or more fields of the second signaling, wherein a first time position associated with the time offset relative to when the second signaling is sent matches a second time position associated with when the HARQ feedback was scheduled for transmission by the first signaling.

24. The apparatus of claim 23, wherein:
  the CRC of the second signaling is scrambled with the C-RNTI; and
  the second signaling includes a field set to a value indicating to transmit the HARQ feedback.

25. The apparatus of claim 23, wherein the one or more fields identify the time offset associated with the HARQ feedback.

26. The apparatus of claim 22, wherein the signaling includes a field set to a value indicating to transmit the HARQ feedback.

27. The apparatus of claim 26, wherein the one or more fields includes a modulation and coding scheme field associated with a transport block.

28. The apparatus of claim 22, wherein:
  the signaling includes downlink control information;
  the HARQ feedback includes one or more acknowledgements or one or more negative acknowledgments;
  the HARQ feedback includes one or more HARQ process identifiers; and
  the HARQ feedback is associated with a Type-1 or a Type-2 HARQ-Acknowledgement (HARQ-ACK) codebook.

* * * * *